US007542517B2

(12) United States Patent
Kroeger

(10) Patent No.: US 7,542,517 B2
(45) Date of Patent: Jun. 2, 2009

(54) PEAK-TO-AVERAGE POWER REDUCTION FOR FM OFDM TRANSMISSION

(75) Inventor: Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 703 days.

(21) Appl. No.: 10/770,314

(22) Filed: Feb. 2, 2004

(65) Prior Publication Data

US 2005/0169411 A1   Aug. 4, 2005

(51) Int. Cl.
*H04L 25/49* (2006.01)
*H04L 27/28* (2006.01)

(52) U.S. Cl. .................. 375/296; 375/229; 375/260

(58) Field of Classification Search ............ 375/296, 375/260, 229; 370/203–211; 455/114.3
See application file for complete search history.

(56) References Cited

U.S. PATENT DOCUMENTS

| 5,201,071 A | 4/1993 | Webb |
| 5,300,894 A | 4/1994 | Myer et al. |
| 5,302,914 A | 4/1994 | Arntz et al. |
| 5,349,300 A | 9/1994 | Matz et al. |
| 5,381,449 A | 1/1995 | Jasper et al. |
| 5,396,516 A | 3/1995 | Padovani et al. |
| 5,598,436 A | 1/1997 | Brajal et al. |
| 5,606,578 A | 2/1997 | O'Dea |
| 5,610,908 A | 3/1997 | Shelswell et al. |
| 5,621,762 A | 4/1997 | Miller et al. |
| 5,696,794 A | 12/1997 | O'Dea |
| 5,710,990 A | 1/1998 | Long et al. |
| 5,727,026 A | 3/1998 | Beukema |
| 5,815,532 A | 9/1998 | Bhattacharya et al. |
| 5,835,536 A | 11/1998 | May et al. |

(Continued)

FOREIGN PATENT DOCUMENTS

EP       0907276 A1    4/1999

(Continued)

OTHER PUBLICATIONS

B. S. Krongold et al., "PAR Reduction in OFDM Via Active Constellation Extension," *IEEE Transactions on Broadcasting*, vol. 49, No. 3, Sep. 2003, pp. 258-268.

(Continued)

*Primary Examiner*—Shuwang Liu
*Assistant Examiner*—David Huang
(74) *Attorney, Agent, or Firm*—Robert P. Lenart, Esq.; Pietragallo Gordon Alfano Bosick & Raspanti, LLP

(57) ABSTRACT

A method of reducing peak-to-average power ratio in an OFDM signal comprises the steps of modulating a set of subcarriers with a set of data symbol vectors to produce a first modulated signal, limiting the magnitude of the first modulated signal to produce a first limited modulated signal, demodulating the first limited modulated signal to recover distorted input symbol vectors, constraining the distorted input symbol vectors to values greater than or equal to a minimum threshold value to produce constrained data symbol vectors, constraining out-of-band spectral components to lie within a predetermined mask, and remodulating the constrained data symbol vectors. A transmitter that performs the method is also included.

20 Claims, 11 Drawing Sheets

U.S. PATENT DOCUMENTS

| | | | |
|---|---|---|---|
| 5,838,732 A | 11/1998 | Carney | |
| 6,128,350 A * | 10/2000 | Shastri et al. | 375/260 |
| 6,166,601 A * | 12/2000 | Shalom et al. | 330/151 |
| 6,314,146 B1 | 11/2001 | Tellado et al. | |
| 6,343,218 B1 | 1/2002 | Kaneda et al. | |
| 6,429,736 B1 * | 8/2002 | Parry et al. | 330/2 |
| 6,549,544 B1 * | 4/2003 | Kroeger et al. | 370/482 |
| 6,556,557 B1 | 4/2003 | Cimini, Jr. et al. | |
| 7,013,161 B2 * | 3/2006 | Morris | 455/522 |
| 7,031,251 B2 * | 4/2006 | Chen et al. | 370/208 |
| 2001/0026602 A1 * | 10/2001 | Wiese et al. | 375/350 |
| 2005/0017800 A1 * | 1/2005 | Robinson | 330/149 |
| 2005/0094752 A1 * | 5/2005 | Frahm et al. | 375/350 |
| 2005/0180534 A1 * | 8/2005 | Brotje et al. | 375/350 |

FOREIGN PATENT DOCUMENTS

| | | |
|---|---|---|
| EP | 1067705 A1 | 1/2001 |
| WO | WO9631013 A1 | 10/1996 |

OTHER PUBLICATIONS

A. Saul, "Comparison Between Recursive Clipping and Active Constellation Extension for Peak Reduction in OFDM Systems," *in Proc. of Int. Symp. On Wireless Personal Multimedia Communications*, vol. 1, Yokusuka, Japan, Oct. 19-22, 2003, pp. 37-41.

* cited by examiner

PEAK-TO-AVERAGE POWER REDUCTION FOR FM OFDM TRANSMISSION

FIELD OF THE INVENTION

This invention relates to signal processing for radio frequency signals, and more particularly to signal processing for reducing the peak to average power (PAR) ratio in orthogonal frequency division modulated (OFDM) radio frequency signals.

BACKGROUND OF THE INVENTION

HD Radio™ digital broadcasting is a medium for providing digital-quality audio, superior to existing analog broadcasting formats. Both AM and FM HD Radio™ signals can be transmitted in a hybrid format where the digitally modulated signal coexists with the currently broadcast analog AM or FM signal, or in an all-digital format without an analog signal. In-band-on-channel (IBOC) HD Radio™ systems require no new spectral allocations because each HD Radio™ signal is simultaneously transmitted within the same spectral mask of an existing AM or FM channel allocation. IBOC HD Radio™ promotes economy of spectrum while enabling broadcasters to supply digital quality audio to their present base of listeners. An HD Radio™ digital broadcasting system is described in U.S. Pat. No. 6,549,544, which is hereby incorporated by reference.

One proposed FM HD Radio™ broadcasting system uses a set of orthogonal frequency division multiplexed (OFDM) subcarriers to transmit a digital signal. OFDM modulation is a well-known technique that modulates a vector of information symbols in parallel over a number of individual orthogonally-spaced subcarriers. An OFDM signal includes multiple subcarriers modulated at different equally spaced frequencies, which are orthogonal to each other. OFDM modulation has proven to be an effective means for transmission over channels that experience various types of multipath and linear distortion. This ensures that different subcarriers do not interfere with each other under normal channel conditions.

In conventional serial modulation (not OFDM), a number (e.g. 100) of QPSK symbols (200 bits) is modulated in a sequence of 100 complex QPSK symbols over a total time interval T. In contrast OFDM groups these symbols as a vector and transmits the QPSK symbols in parallel as 100 subcarriers each modulating a single QPSK symbol. Each of the parallel OFDM subcarriers in this example occupies approximately one hundredth of the serial QPSK bandwidth and spans approximately the same time T. Both the bandwidth and throughput of the serial and OFDM transmissions are approximately the same. Small differences in the time and bandwidth are a result of channel filtering for mostly the serial transmission, and guard time (if any) in the OFDM case.

Unfiltered QPSK modulation results in a constant signal magnitude where only the phase is modulated. Therefore its Peak-To-Average Power Ratio (PAR) is one, and the power efficiency of the transmitter's high power amplifier (HPA) is high. More conventional filtered QPSK (i.e., square-root Nyquist filtering) results in a small amplitude modulation component of the modulated signal where its PAR is small (typically about 1 or 2 dB), and the HPA efficiency is high, but not as high as unfiltered QPSK.

The magnitude of the transmitted signal in such a system with OFDM modulation occasionally has very high peaks. Therefore the linear power amplifiers used in these transmitters need to operate with large power back-offs so that the out-of-band emission power is below the imposed mask limits. This results in expensive and inefficient amplifiers. For a large number of subcarriers, each complex dimension (inphase and quadrature) of the OFDM signal approaches a Gaussian distribution. This results in a signal magnitude (square root of power) Probability Density Function (PDF) that approaches a Rayleigh distribution.

Although the Rayleigh distribution has theoretically infinite peaks, the OFDM peak is limited by the number of parallel subcarriers (e.g., 100, or 20 dB), or more practically the typical peak can be limited to about 12 dB since there is little distortion in clipping the improbable tails (e.g., above 12 dB PAR) of the Rayleigh PDF. HPA power efficiency is affected since a large power backoff is required in operation to minimize peak distortion. This peak distortion not only distorts (adds noise) the subcarrier modulation, but unwanted out-of-band emission occurs due to intermodulation distortion. This leakage, being highest immediately outside the intended spectral occupancy, can be particularly difficult to suppress with filters after the HPA output. Hence, there is a need to reduce the peak-to-average power ratio (PAR) for an OFDM signal.

Several different types of PAR reduction techniques have been proposed. Some types require additional coding or phase rotation of the subcarriers. However these PAR reduction techniques require reliable side information to undo the manipulations upon demodulation, and are less attractive. Another class of PAR reduction techniques relies on an iterative algorithm to clip and predistort (or constrain) the signal to achieve the PAR reduction and suppress out-of-band emissions, requiring no additional side information. These techniques are disclosed in A. Shastri & B. Kroeger, "Method and Apparatus for Reducing Peak to Average Power Ratio in Digital Broadcasting Systems," U.S. Pat. No. 6,128,350, Oct. 3, 2000, and B. Krongold & D. Jones, "PAR Reduction In OFDM Via Active Constellation Extension," IEEE Trans. Broadcasting, Vol. 49, No. 3, pp. 258-268, September 2003.

This invention provides a method for reducing the PAR of electronic signals using OFDM, such as may be used in FM HD Radio™ systems.

SUMMARY OF THE INVENTION

This invention provides a method of reducing peak-to-average power ratio in an OFDM signal comprising the steps of modulating a set of subcarriers with a set of data symbol vectors to produce a first modulated signal, limiting the magnitude of the first modulated signal to produce a first limited modulated signal, demodulating the first limited modulated signal to recover distorted input symbol vectors, constraining the distorted input symbol vectors to values greater than or equal to a minimum threshold value to produce constrained data symbol vectors, constraining out-of-band spectral components to lie within a predetermined mask, and remodulating the constrained data symbol vectors.

In another aspect, the invention provides a transmitter for reducing peak-to-average power ratio in an OFDM signal. The transmitter comprises a modulator for modulating a set of subcarriers with a set of data symbol vectors to produce a first modulated signal, a limiter for limiting the magnitude of the first modulated signal to produce a first limited modulated signal, a demodulator for demodulating the first limited modulated signal to recover distorted input symbol vectors, a processor for constraining the distorted input symbol vectors to values greater than or equal to a minimum threshold value to produce constrained data symbol vectors and for constraining out-of-band spectral components to lie within a predetermined mask, and a remodulator for remodulating the constrained data symbol vectors.

DETAILED DESCRIPTION OF THE INVENTION

Figure 1:
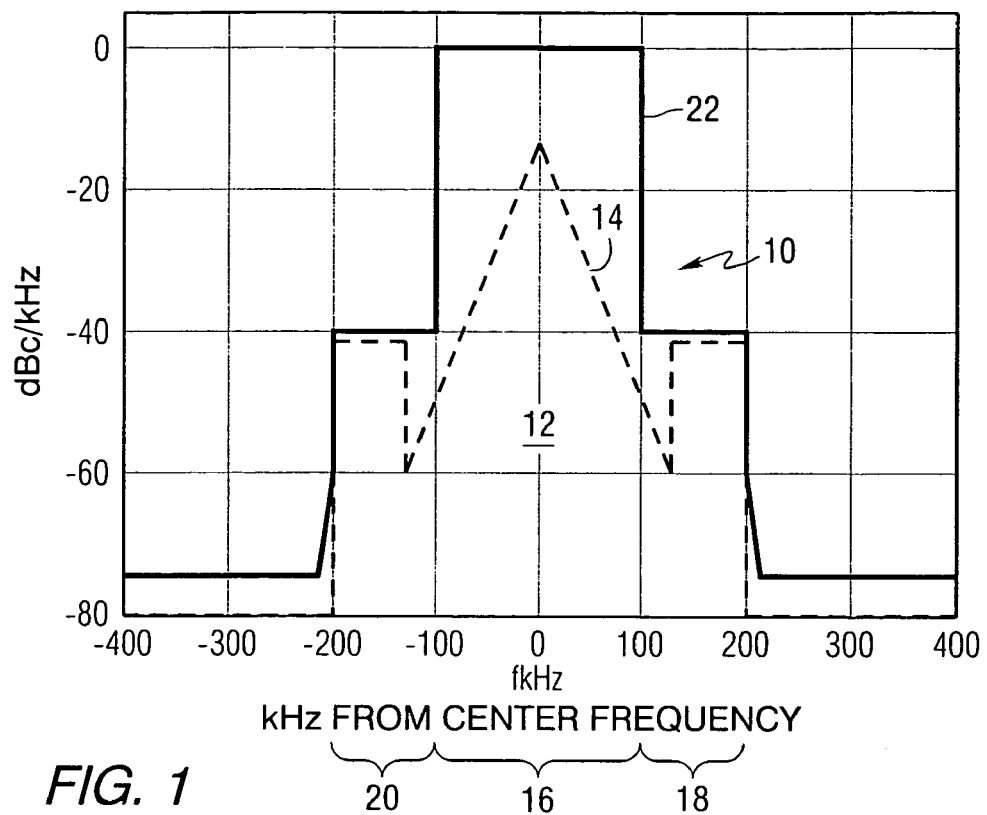
FIG. 1 is a schematic representation of an HD Radio™ FM Hybrid mode ideal signal and spectral mask.

Referring to the drawings, FIG. 1 is a schematic representation of the frequency allocations and relative power spectral density of the signal components for a hybrid FM IBOC HD Radio™ signal 10. The hybrid format includes the conventional FM stereo analog signal 12 having a power spectral density represented by the triangular shape 14 positioned in a central frequency band 16 portion of the channel. The Power Spectral Density (PSD) of a typical analog FM broadcast signal is roughly triangular with a slope of about −0.35 dB/kHz from the center frequency. A plurality of digitally modulated evenly spaced subcarriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22. The vertical axis in FIG. 1 shows the peak power spectral density as opposed to a more conventional average power spectral density characterization.

In one proposed FM Hybrid HD Radio™ modulation format, a group of evenly spaced orthogonal frequency division multiplexed (OFDM) subcarriers are placed on each side of the host analog FM signal occupying the spectrum from about 129 kHz through about 199 kHz away from the host FM center frequency as illustrated by the upper sideband and the lower sideband in FIG. 1. In this hybrid system the total digital signal power in the OFDM modulated subcarriers in each sideband is set to about −23 dBc (relative to its host analog FM power). The digital signal is transmitted on the OFDM subcarriers located on either side of the analog spectrum. The digital OFDM signal includes 191 subcarriers above and 191 subcarriers below the host FM spectrum. Each subcarrier is QPSK modulated at a symbol rate of 344.53125 Hz. The in-phase and quadrature phase pulse shapes are root raised cosine tapered (excess time=7/128) at the edges to suppress the spectral sidelobes. This pulse shape results in orthogonal subcarrier frequency spacing of 363.3728 Hz.

Figure 2:
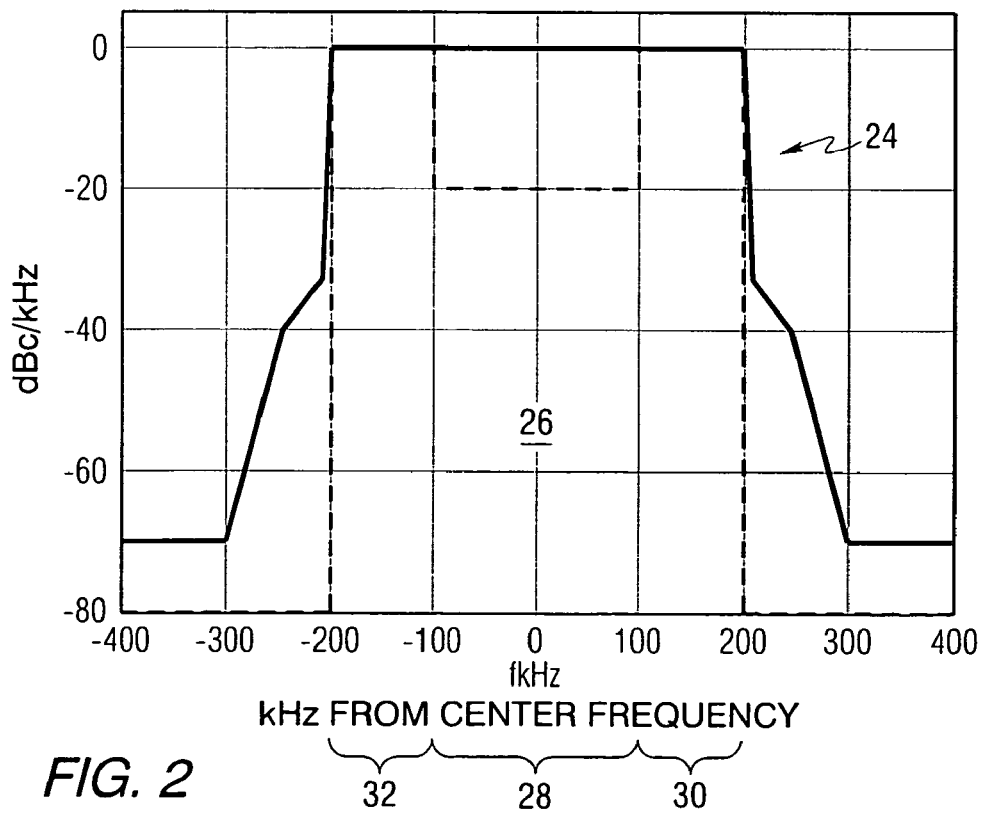
FIG. 2 is a schematic representation of an HD Radio™ FM All-Digital mode ideal signal and spectral mask.

The digitally modulated portion of the hybrid signal is a subset of an all-digital DAB signal that will be transmitted in the all-digital IBOC DAB format. The spectral placement and relative signal power density levels of the OFDM digital subcarriers in a proposed all-digital FM DAB format illustrated by item number 24, is shown in FIG. 2. The analog FM signal of FIG. 1 has been replaced by an optional additional group of OFDM subcarriers, referred to as the extended all-digital signal 26, located in the central frequency band 28. Once again evenly spaced OFDM subcarriers are positioned in an upper sideband 30 and a lower sideband 32. The sidebands of the all-digital format of FIG. 2 are wider than the sidebands of FIG. 1. In addition, the power spectral density level of the all-digital IBOC signal sidebands is set about 10 dB higher than that allowed in the hybrid IBOC sidebands. This provides the all-digital IBOC signal with a significant performance advantage. Furthermore the power spectral density of the extended all-digital signal is about 15 dB below that of the hybrid IBOC sidebands. This minimizes or eliminates any interference problems for adjacent hybrid or all-digital IBOC signals while providing additional capacity for other digital services.

The all-digital mode of FIG. 2 is a logical extension of the hybrid mode where the analog signal, which previously occupied the central ±100 kHz region is replaced with low level digital subcarriers. Located on either side of the low-level carriers are two digital sidebands that differ from the hybrid mode by increasing the bandwidth to about 100 kHz and increasing the power by about 10 dB. A proposed all-digital system includes 267 carriers in each sideband and 559 carriers in the center. Each digital subcarrier is QPSK modulated. The in-phase and quadrature phase pulse shapes are root raised cosine tapered (excess time=7/128) at the edges to suppress the spectral sidelobes. This pulse shape results in orthogonal subcarrier frequency spacing of 363.3728 Hz. The power spectral density plots for the transmitted signal should be well within the all-digital FM IBOC mask.

FIGS. 1 and 2 show ideal spectrums of the FM HD Radio™ system hybrid and all-digital signals, along with their proposed spectral masks governing out-of-band emissions. Although the ideal signals are contained within their masks, nonlinear distortion, such as high power amplifier (HPA) compression or peak clipping, raise the out-of-band emissions and must be controlled for efficient HPA operation.

Figure 3:
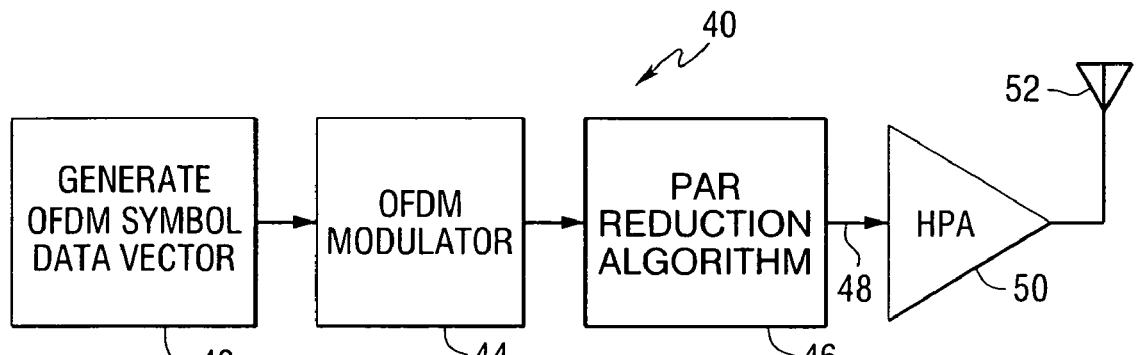
FIG. 3 is a simplified functional block diagram of a transmitter system including the PAR reduction algorithm.

FIG. 3 is a simplified functional block diagram of a transmitter system including the PAR reduction algorithm inserted between the OFDM modulator and the HPA. The transmitter 40 includes a symbol generator 42 that produces OFDM symbol data vectors consisting of a group of Quadrature Phase Shift Keying (QPSK) data symbols containing the information to be transmitted on each of the active subcarriers. These symbols are passed to a modulator 44 wherein each OFDM symbol data vector is modulated to produce the digital time-domain signal samples (normalized). This modulation includes passing the data symbols through an Inverse Fast Fourier Transform (IFFT) to realize the OFDM modulation. A cyclic prefix, along with a root raised cosine window, is applied to the modulated signal (excess time=7/128). The combination of the IFFT and the windowing operation is referred to henceforth as the OFDM modulator. The modulated output of OFDM modulator is passed as an input to the PAR reduction algorithm 46. The output 48 of this block is amplified by high power amplifier 50 and forms the signal to be transmitted with a reduced PAR at antenna 52.

Figure 4:
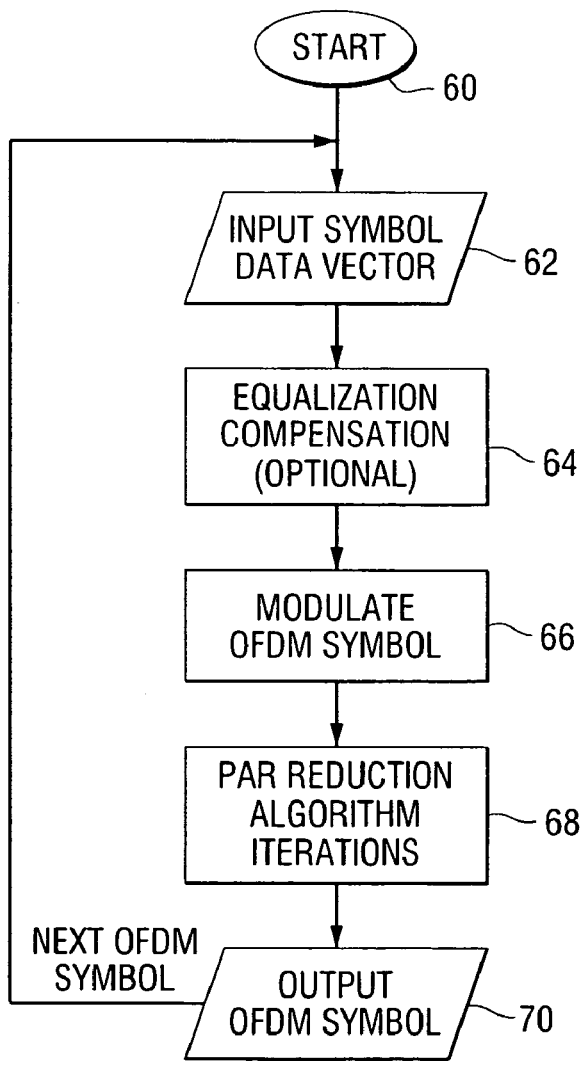
FIG. 4 is a top-level flowchart of PAR reduction algorithm.

A top-level flowchart of major PAR reduction algorithm steps is presented in FIG. 4. This flowchart starts at block 60 and shows the operations of inputting OFDM symbol data, through outputting modulated and PAR-reduced time domain signal samples for each OFDM symbol. The Input Symbol Data Vector block 62 shows that the input is a data vector comprising the bit pairs for each active QPSK subcarrier for the OFDM symbol. This can be viewed as the frequency-domain representation for each FFT bin (subcarrier) prior to OFDM modulation, where the FFT converts a complex time-domain signal block into complex frequency component bins uniformly spaced over the sample-rate bandwidth. Each active bin is represented by a complex binary number for QPSK modulation on that bin (subcarrier). Active bins with intentionally-reduced signal levels can be scaled to other binary sets of levels. Inactive bins are set to zero.

The Equalization Compensation block 64 shows an optional equalization compensation step. When linear distortion (filtering) is a significant factor at the transmitter's output network (HPA output), then equalization compensation can be used to precorrect the input to the HPA. The equalization compensation uses a vector (the same size as the input vector) containing the reciprocal of the complex output gain (linear distortion) for each subcarrier. The complex gain associated with each bin is a complex number which, in effect, multiplies (distorts) the original complex frequency sample (bin). Each of the elements of the input vector is multiplied by each of the corresponding element of the equalization vector to yield an equalized input symbol data vector.

The Modulate OFDM Symbol block 66 shows that the input symbol data vector is converted into a time domain signal for each OFDM symbol. This transformation is performed via an inverse complex fast Fourier transform (IFFT), then a cyclic prefix with a predetermined guard time is appended to the end of the output vector prior to tapering the ends of the symbol with a root-Nyquist pulse shape. This guard time, cyclic prefix extension, and windowing are used to improve the signal's performance in the presence of multipath interference, as well as suppress the frequency sidelobes of the subcarriers resulting in reduced out-of-band emissions.

The PAR reduction algorithm iterations block 68 represents the algorithms used in reducing the PAR of the modulated OFDM symbol. The details of these algorithms are described later and in the flowchart of FIG. 5.

The Output OFDM Symbol block 70 outputs the time domain samples of the PAR-reduced OFDM signal. Then the process continues for subsequent OFDM symbols.

Figure 5:
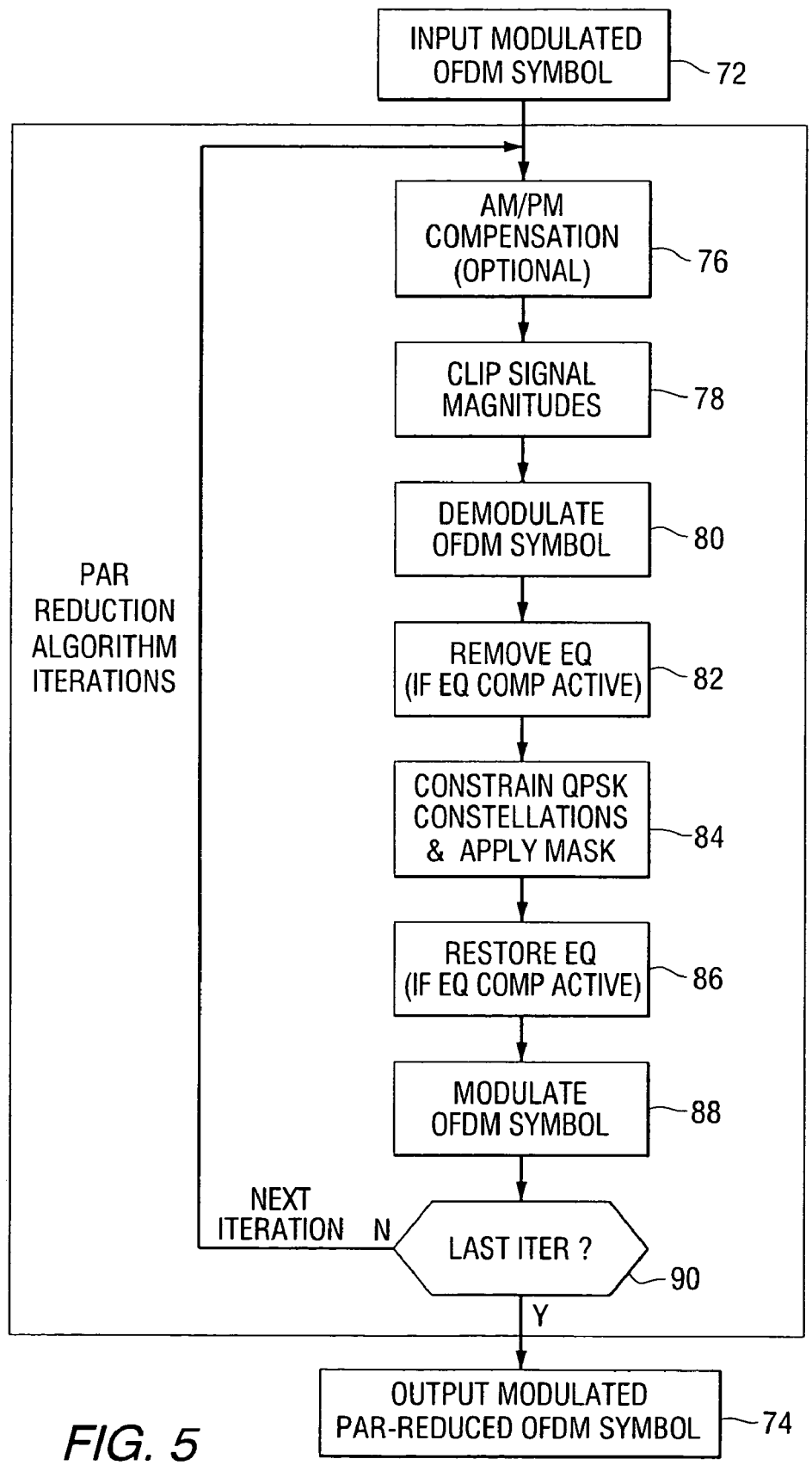
FIG. 5 is a flowchart of PAR reduction algorithm iterations block.

A flowchart showing more details of the PAR reduction algorithm iterations block 68 of FIG. 4 is presented in FIG. 5. The input 72 to this flowchart is a sequence of modulated OFDM symbols, while the output 74 is the PAR-reduced version of these symbols. This iterative algorithm continues to reduce the PAR of the symbol while constraining the frequency domain (symbol vector) distortion and out-of-band emissions to acceptable levels. After some iterations, the algorithm converges to an acceptable compromise PAR while constraining the distortion to acceptable levels.

Block 76 represents an optional AM/PM compensation. This function can be used to partially compensate for the AM/PM distortion introduced by the HPA. AM/PM is generally characterized by a slight delay in the time domain signal peaks as the signal in the HPA approaches saturation. By modeling this effect within the PAR reduction iterative process, the AM/PM degradation can be reduced.

The Clip Signal Magnitudes block 78 represents a function that clips (limits) the magnitudes of the complex time domain OFDM symbol samples to a predetermined value (e.g. 1.5 times the rms level, or 3.52 dB PAR). The peak to average power reduction is accomplished by clipping or limiting the peak magnitudes. The phase of each sample is preserved. This clipping process introduces distortion and out-of-band emissions which are later corrected in the frequency domain processing within the iteration.

The Demodulate OFDM Signal block 80 illustrates the demodulation process that is the reverse of the modulate OFDM symbol process described previously. The demodulation steps include weighting and folding of the ends (where the cyclic prefix was appended in the previous modulation step) of the symbol time, then computing an FFT to yield a somewhat distorted version of the input symbol data vector.

The Remove Eq. (if Eq. Comp. active) block 82 shows that if the optional frequency-domain equalization compensation of FIG. 4 was performed, then this equalization must be temporarily removed for some of the next steps of the algorithm in this iteration. The vector used to remove the equalization is similar to the original equalization vector, but all the elements are reciprocals of the original equalization vector.

The Constrain QPSK Constellations & Apply Mask block 84 shows the removal of significant distortion introduced by the previous signal clipping process. The intermodulation distortion caused by clipping introduces noise (distortion) into all the frequency bins of the symbol vector. This function constrains the distortion components to acceptable levels. This distortion cannot be entirely eliminated since this would have the undesirable effect of restoring the peaks back into the time domain signal. Instead the distortion is modified in such a way as to minimize the degradation in QPSK demodulation performance, and suppress out-of-band emissions to an acceptable level based upon a predefined out-of-band emissions mask vector. More details of this process are presented later. This process results in partial peak regrowth of the time domain signal. Multiple iterations of the PAR algorithm tend toward convergence to minimize the peaks while constraining the intermodulation products to acceptable levels.

The Restore Eq. (if Eq. Comp. active) block 86 shows that if the optional frequency-domain equalization compensation was performed in a previous step, then this equalization must be restored since it was removed in an intermediate step prior to this one.

The Modulate OFDM Symbol block 88 shows conversion of the input symbol data vector into a time-domain signal for each OFDM symbol. This step has been described in the identical block of FIG. 4.

The Last Iter? Block 90 shows that the iterative algorithm ends on the last iteration (a predetermined number of, for example, 4) for this PAR-reduced OFDM symbol.

The modulation and demodulation steps are illustrated by the following algorithm descriptions.

Modulate Ofdm Symbol
OFDM_symbol_vector=input next OFDM symbol vector (e.g., 2048 complex elements)

sig=IFFT(OFDM_symbol_vector)

sigext=sig+append cyclic extension; append 112 samples from start of sig (now length 2160)

$$sigout = \begin{bmatrix} w_0 & & & 0 \\ & w_1 & & \\ & & \bullet & \\ & & & \bullet \\ 0 & & & w_{2179} \end{bmatrix} \cdot sigext;$$

this is the time domain signal of the OFDM symbol where w is the root raised cosine window Demodulate Ofdm Symbol
sigout=input next OFDM symbol time samples (e.g., 2160 complex elements)

$$sigw = \begin{bmatrix} w_0 & & & 0 \\ & w_1 & & \\ & & \bullet & \\ & & & \bullet \\ 0 & & & w_{2179} \end{bmatrix} \cdot sigout;$$

this is the time domain signal of the OFDM symbol where w is the root raised cosine window sig=fold cyclic prefix extension from end of sig by adding these samples to the start of sig (2048)

OFDM_symbol_vector=FFT(sig)

The clipping process acts upon the magnitudes of the complex OFDM symbol samples. For convenience, the nominal RMS value of the input complex OFDM time domain signal samples is scaled to one. An effective value of the clip magnitude level was experimentally determined to be about 1.5 (3.5 dB PAR). The units are in magnitude (voltage) of the complex time-domain samples previously normalized to an rms magnitude of 1. The samples with magnitudes below 1.5 are unaffected. However, samples above 1.5 magnitude are set to 1.5 while preserving the phase of the input sample. Detecting samples above the clip level can be performed using the magnitude squared samples to minimize computations of the square root. The following algorithm can be used as an example:

$s_n = Re\{s_n\} + j \cdot Im\{s_n\}$; input next complex signal sample $magsq_n = Re\{s_n\}^2 + Im\{s_n\}^2$; compute magnitude squared if $(magsq_n > 2.25)$ then let $s_n = \dfrac{s_n}{\sqrt{magsq_n}}$ ; clip if mag >1.5 (equiv.)

Figure 6:
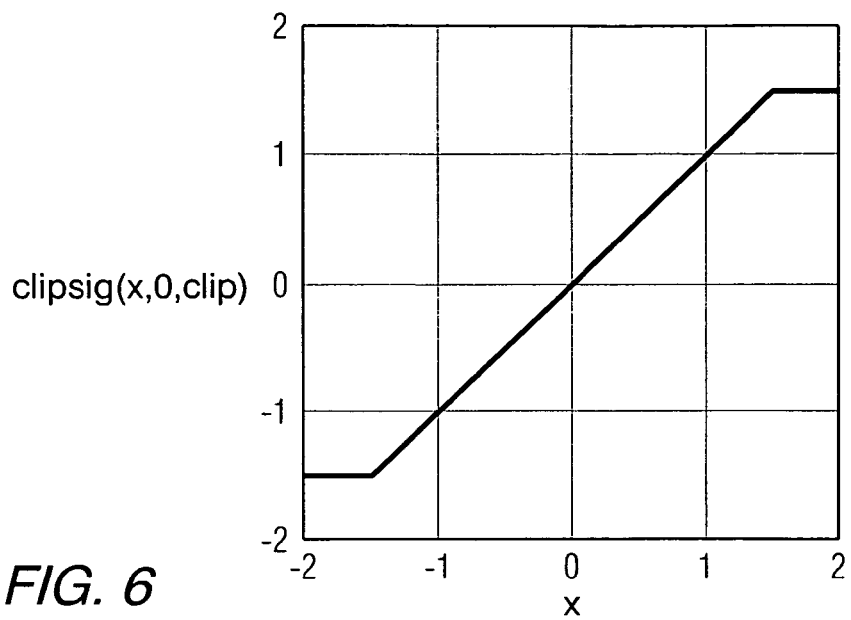
FIG. 6 is a graph showing magnitude clipping nonlinearity function.

Although both soft and hard limiting functions can be used for clipping, the hard limiting function illustrated in the plot of FIG. 6 has been shown to be simple and effective for this example. If the final PAR-reduced time domain signal applied to the HPA is still expected to experience some compression at these reduced peaks, then a soft clipping or compression modeling the HPA should be included in this clipping process. By inclusion of additional HPA compression, the PAR iterations will result in reducing the effects of this distortion.

Soft clipping is a more gradual limiting function than hard clipping. Some HPAs tend to gradually compress the peaks as they approach high values as opposed to hard limiting where the signal is linear up to the limiting value. If the compression of the HPA can be accurately modeled, then this type of clipping may be more effective in some cases.

Figure 7:
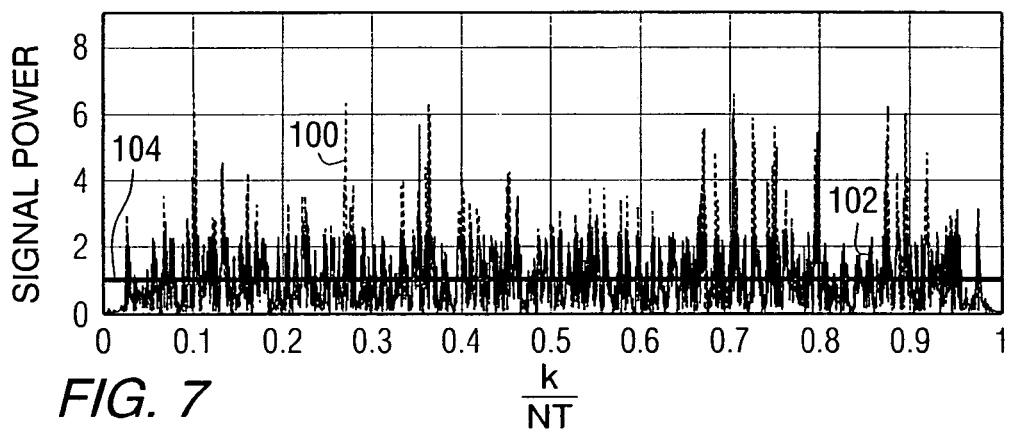
FIG. 7 is a graph showing results of the clipping process on the signal sample energies (magnitudes squared) over one OFDM symbol after eight iterations of the PAR reduction algorithm.

The results of the clipping process after eight iterations of the PAR reduction algorithm is shown in the plots of FIG. 7. Signal energies indicative of the PAR (instead of magnitudes) indicate a PAR of about 4 dB after the PAR reduction algorithm. The OFDM symbol consists of 2160 samples (after a cyclic prefix extension from 2048). The three plots include the unprocessed OFDM signal 100, the PAR-reduced signal 102, and the average signal power 104. The average signal power is equal to 1.

Significant distortion introduced by the signal clipping process is removed by constraining QPSK constellations and applying a mask. The intermodulation distortion, caused by clipping, introduces noise (distortion) into all the frequency bins of the symbol vector. This function constrains the distortion components to acceptable levels. This distortion cannot be entirely eliminated since this would have the undesirable effect of restoring the peaks back into the time domain signal. Instead the distortion is modified in such a way as to minimize the degradation in QPSK demodulation performance, and suppress out-of-band emissions to an acceptable level based upon a predefined out-of-band emissions mask vector. This process results in partial peak regrowth of the time domain signal. Multiple iterations tend toward convergence to minimize the peaks while constraining the intermodulation products to acceptable levels.

Figure 8:
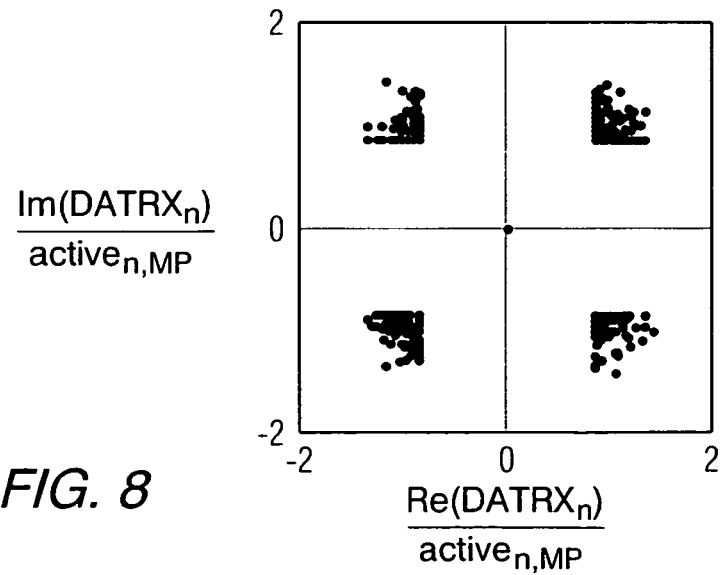
FIG. 8 is a plot showing constrained distortion in the QPSK constellations after PAR reduction algorithm.

The QPSK constellations of the active subcarriers are constrained to minimize degradation in BER (Bit error rate) performance. In the absence of noise and distortion the ideal QPSK constellation consists of complex constellation points (normalized for convenience) at (+1, +1), (+1, −1), (−1, −1) and (−1, −1) depending upon the two bits each symbol conveys. QPSK can also be viewed as a pair of orthogonal BPSK signals, where each of the BPSK components carries one bit. The PAR reduction algorithm, in particular the clipping, adds noise to the constellation points. A bit error occurs when the additive noise changes the polarity of one of the bits; for example if a +1.0 is corrupted to −0.1 (the noise component is −1.1 in this case). The channel adds more noise to the received signal and the BER performance is a function of the margin of the transmitted signal. In other words, if an ideal transmitted signal component +1.0 is corrupted by the PAR algorithm to output +0.5, then the system loses 6 dB of margin for that particular bit. However other bits in the PAR reduction process can actually be enhanced since some of the distortion components will increase the +1.0 value (e.g. +1.2, or 3.5 dB improvement). Even with Forward Error Correction (FEC) improving the output BER at the receiver, the performance is degraded by the code bits that decrease the margin. Therefore the PAR reduction algorithm constrains the loss in margin to an acceptable level relative to 1.0 (e.g., 0.85). So when the previous clipping process distorts a bit component to a value of less than a predetermined threshold (e.g. +0.85, or −0.85 for negative polarity), then the vector is appropriately constrained to the threshold (+0.85, or −0.85 for negative polarity). The bits with a magnitude greater than 0.85 remain unchanged. This constraint has the effect of minimizing the worst case margin loss for any particular bit, while causing only modest peak signal regrowth in the time domain signal. The process of constraining the QPSK constellation points is illustrated in FIG. 8, where the threshold in this example is set to 0.85, and superimposing the points for several hundred QPSK symbols. Although some of the bits actually experience an increase in signal margin, the overall loss in BER performance is minimal.

The appropriate value for the threshold is a compromise between loss of BER margin and peak regrowth. For example, if the threshold is set to 0.95, then the BER margin loss is even less, but the peak regrowth is greater. Successive iterations of the clipping and constraint processes continue to reduce the PAR while it meets the constellation constraints as it converges to some minimum PAR value. An example of the QPSK constraint algorithm is:

if $(Re\{QPSK_n\} < \text{thres} \cdot Re\{d_n\})$ AND $(Re\{d_n\} > 0$, then
  let $x = \text{thres} \cdot Re\{d_n\}$ if $(Im\{QPSK_n\} > \text{thres} \cdot Im\{d_n\})$ AND $(Im\{d_n\} < 0$, then
  let $x = \text{thres} \cdot Im\{d_n\}$ otherwise leave $QPSK_n$ unchanged.

In the algorithm above, $d_n$ is the appropriate complex element of the input OFDM symbol data vector where $d_n$ is the complex (possibly scaled) binary data for the corresponding QPSK symbol. The complex $QPSK_n$ value is the PAR-reduced version of that element after clipping and constraint iterations. Scaling of $d_n$ allows active subcarriers at different levels used in the all-digital option discussed later.

Some broadcasting systems may use reference subcarriers to aid in coherent signal tracking and to estimate channel state information (CSI) for subsequent FEC soft-decoding. It is desirable for these subcarriers to have no distortion from the PAR reduction algorithm. For these subcarriers the constraint illustrated in block 84 of FIG. 5 could be to correct these QPSK constellations to exactly the original OFDM symbol data vector values. Since the number of reference subcarriers is typically small relative to the data bearing subcarriers, the regrowth of time domain peaks in the modulated signal is minimal.

The nonactive subcarriers are also constrained to suppress out-of-band emissions within an acceptable predetermined mask level. An out-of-band emission mask is a vector of the same size as the OFDM symbol vector, where the inactive subcarriers are associated with a maximum mask magnitude defined for each inactive subcarrier. The inactive subcarriers for each OFDM symbol vector are constrained to not exceed the mask magnitude (or magnitude squared for computational efficiency) value. Each subcarrier (FFT bin) is unaffected when its value is below the mask. When a bin exceeds this mask, the magnitude is constrained to the mask level while preserving the phase of the bin. The following algorithm achieves this mask constraint:

$$\text{magsq}_n = Re\{X_n\}^2 + Im\{X_n\}^2; \text{ where } X_n = \text{inactive bin value for OFDM symbol vect.}$$

$$\text{f } magsq_n < mask_n^2, \text{ then let } X_n = X_n \cdot \frac{mask_n}{\sqrt{magsq_n}}$$

otherwise leave $X_n$ unchanged.

Figure 9:
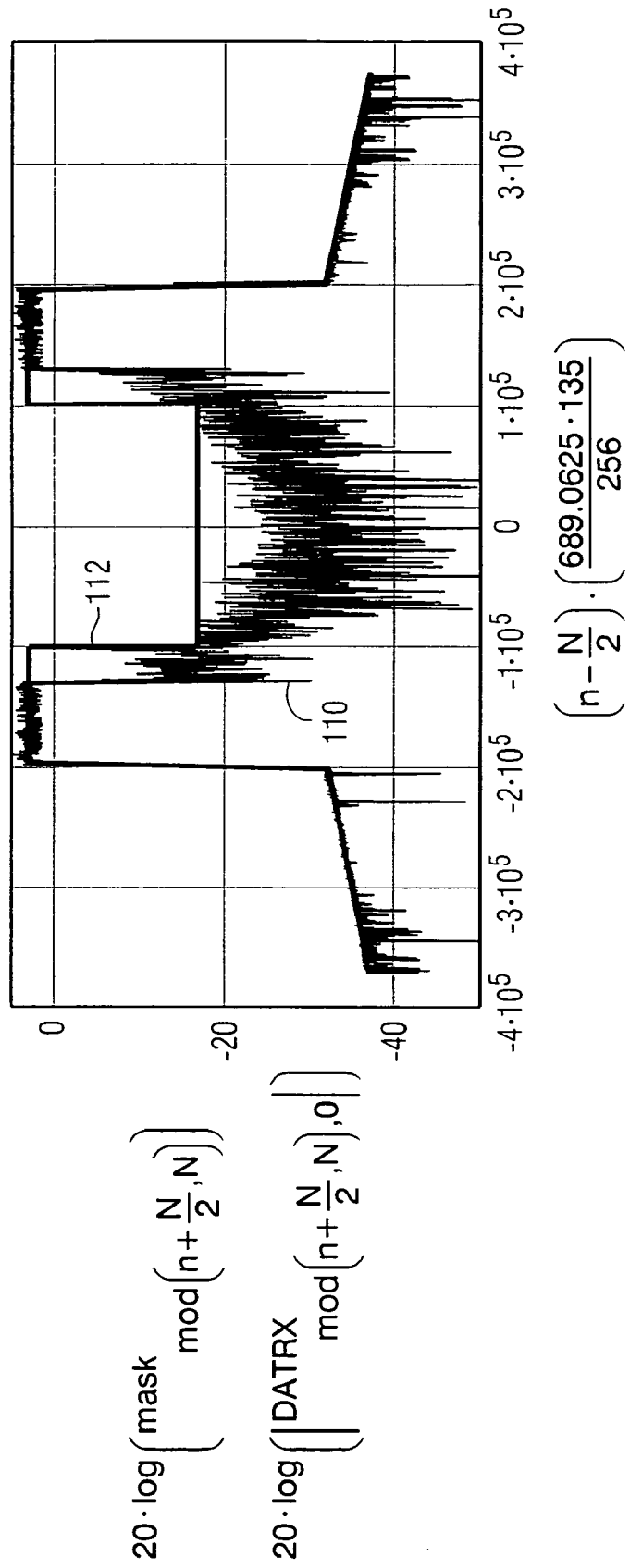
FIG. 9 is a plot showing the signal spectrum after PAR reduction along with the imposed spectral mask for out-of-band emissions for HD Radio™ FM Hybrid mode MP1.

A spectral plot of the modulated signal after the PAR reduction algorithm is shown in FIG. 9. HD Radio™ systems can broadcast in various modes as discussed in the previously mentioned U.S. Pat. No. 6,549,544. The signal in FIG. 9 represents an FM Hybrid mode (MP1) utilizing active subcarriers in the frequency range of approximately 129 through 199 kHz on either side of the center FM frequency. There are 191 subcarriers on each sideband (382 total) where every 19 th subcarrier is a reference subcarrier. The FM analog signal spectrum is omitted in this plot where only the digital portion 110 of the signal spectrum is shown. Notice that the noise outside the active subcarriers is constrained to be under the mask 112.

Figure 11:
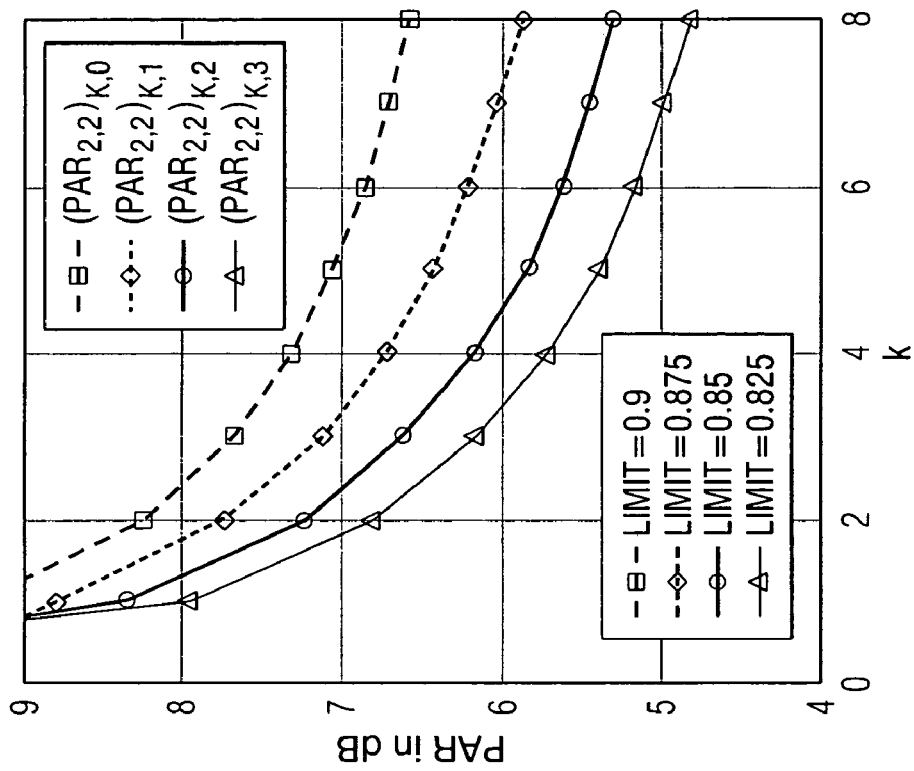
FIG. 11 is a graph showing simulated peak PAR results for the PAR reduction algorithm for HD Radio™ FM Hybrid mode MP1 over a range of constraint values (limits between 0.825 and 0.9).
Figure 10:
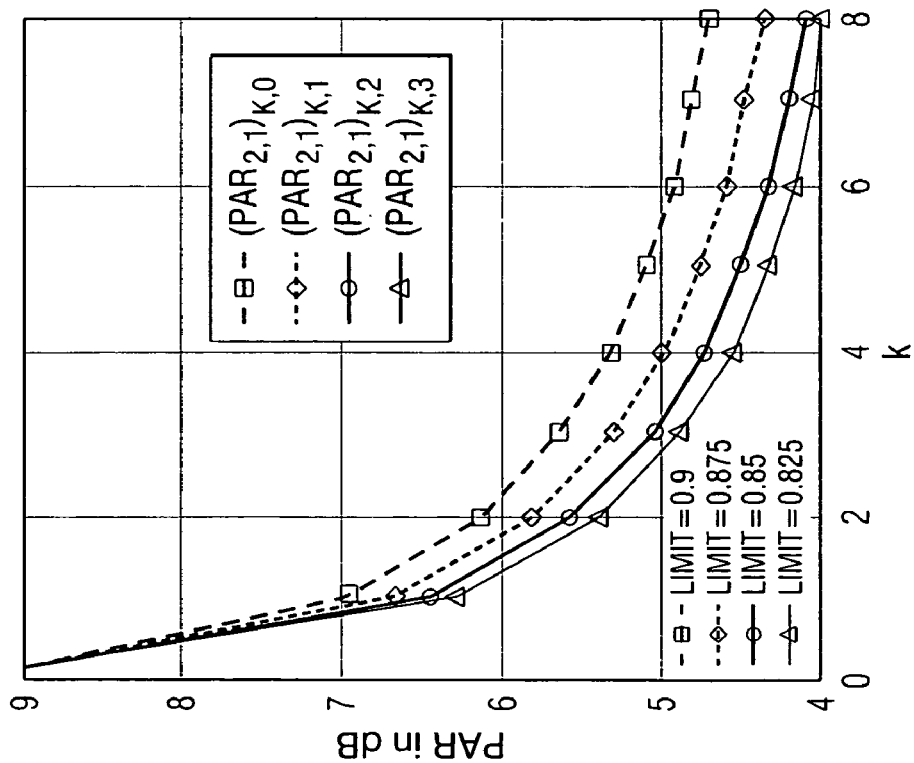
FIG. 10 is a graph showing simulated average PAR results for the PAR reduction algorithm for HD Radio™ FM Hybrid mode MP1 over a range of constraint values (limits between 0.825 and 0.9).

The PAR performance using the algorithms just described was simulated with the results presented in FIGS. 10 and 11. FIG. 10 is a graph showing simulated average PAR results for the PAR reduction algorithm for HD Radio™ FM Hybrid mode MP1 over a range of constraint values (limits between 0.825 and 0.9). FIG. 11 is a graph showing simulated peak PAR results for the PAR reduction algorithm for HD Radio™ FM Hybrid mode MP1 over a range of constraint values (limits between 0.825 and 0.9).

The simulations span 64 OFDM symbols where the resulting PAR values were shown as average or peak over the 64 OFDM symbols in the two plots. The PAR reduction shows improvement as it tends to converge over eight iterations. A good value for the QPSK constraint (limit) seems to be about 0.85. In this case the average PAR achieved is less than 5 dB within four iterations of the algorithm. This compares to an initial PAR of roughly 10 dB. An average PAR of less than 4 dB can be achieved with multiple iterations resulting in a potential average PAR reduction of greater than 6 dB for this example.

Figure 12:
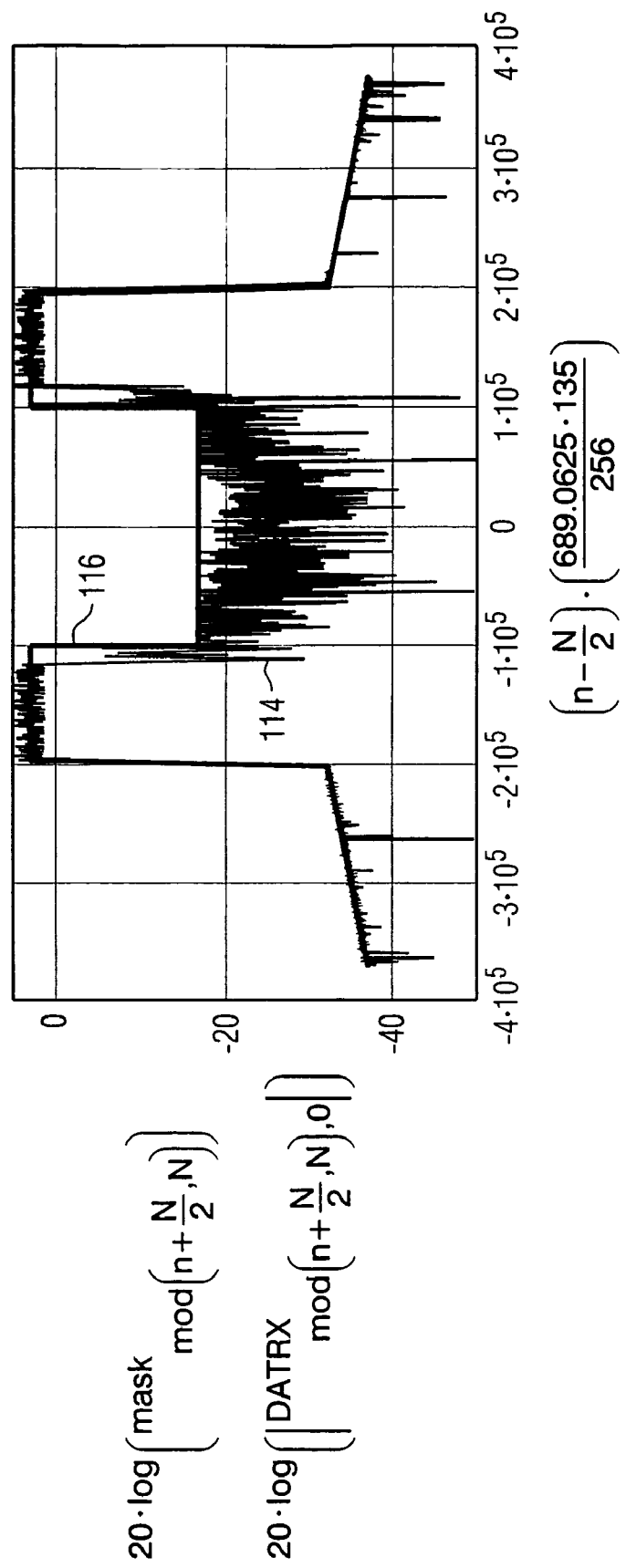
FIG. 12 is a plot showing the signal spectrum after PAR reduction along with the imposed spectral mask for out-of-band emissions for HD Radio™ FM Hybrid mode MP3.
Figure 14:
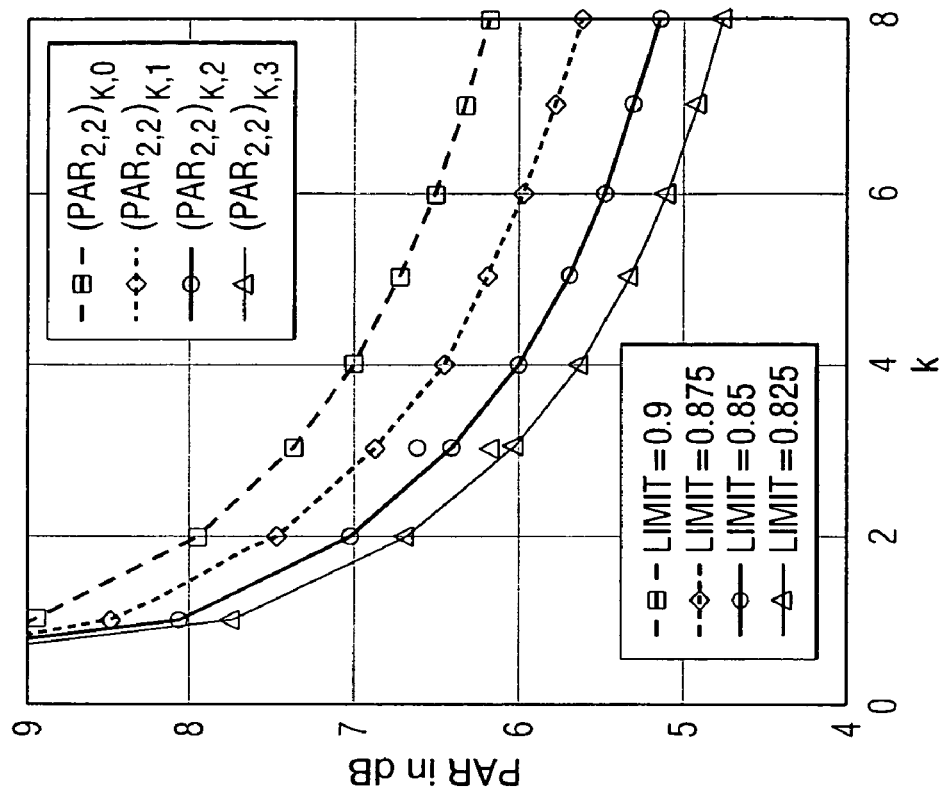
FIG. 14 is a graph showing simulated peak PAR results for the PAR reduction algorithm for HD Radio™ FM Hybrid mode MP3 over a range of constraint values (limits between 0.825 and 0.9).
Figure 13:
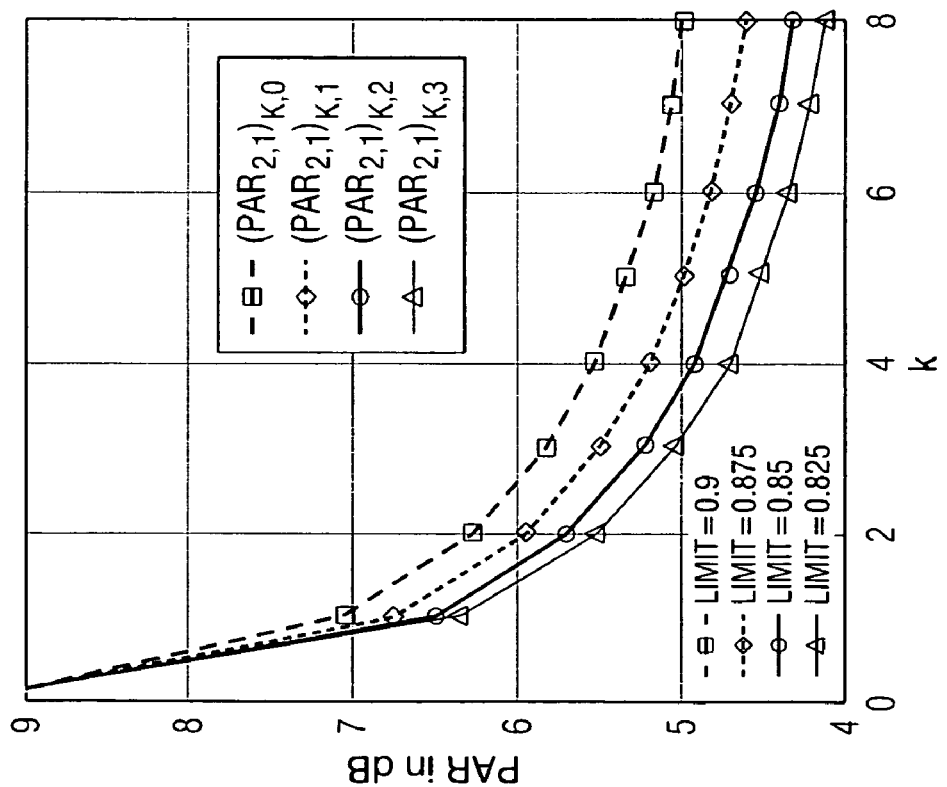
FIG. 13 is a graph showing simulated average PAR results for the PAR reduction algorithm for HD Radio™ FM Hybrid mode MP3 over a range of constraint values (limits between 0.825 and 0.9).

For comparison, FIGS. 12, 13 and 14 show the PAR performance for HD Radio™ FM Hybrid Mode (MP3) where 267 subcarriers (534 total) are active on each sideband. The results here are similar to the MP1 mode, but the PAR reduction is slightly less due to proportionally more constraints in the increased number of subcarriers. In FIG. 12, the digital portion is labeled 114, and the mask is labeled 116.

Constraining QPSK constellations in an all-digital mode can now be described. The HD Radio™ all-digital FM mode (MP4) fills the entire ±200 kHz of bandwidth with active subcarriers with no FM analog signal present. The new secondary subcarriers within ±100 kHz are transmitted at a reduced level nominally 20 dB below the primary subcarriers beyond ±100 kHz. This is where a scaling of the secondary subcarriers (bins) of the OFDM data vector is used on the binary data. Although the same PAR reduction algorithm described previously could be applied, the relative distortion in mostly the outer secondary subcarriers is increased. This increase in relative distortion is due to the intermodulation products of the nearby primary subcarriers that are 20 dB higher in level. An additional constraint is placed upon these secondary subcarriers to further reduce this increased relative distortion.

Figure 15:
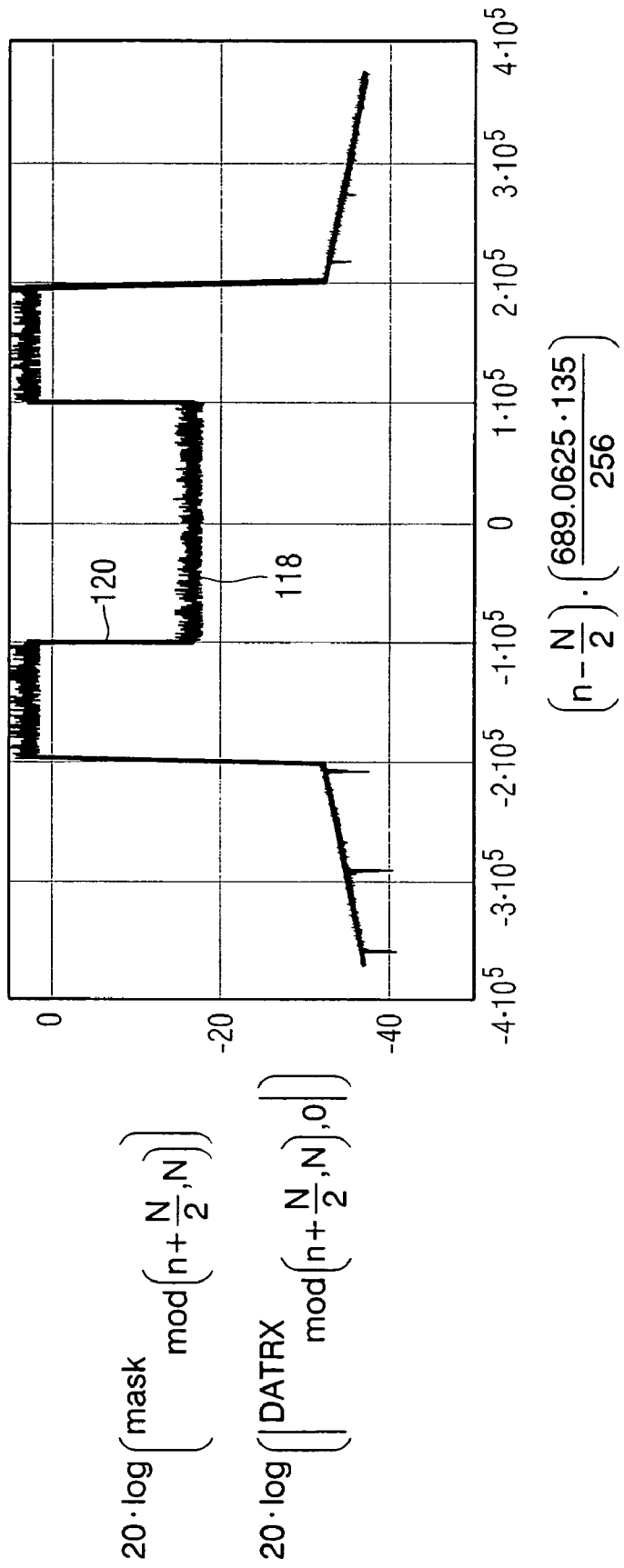
FIG. 15 is a plot showing the signal spectrum after PAR reduction along with the imposed spectral mask for out-of-band emissions for HD Radio™ FM all-digital mode MP4.
Figure 17:
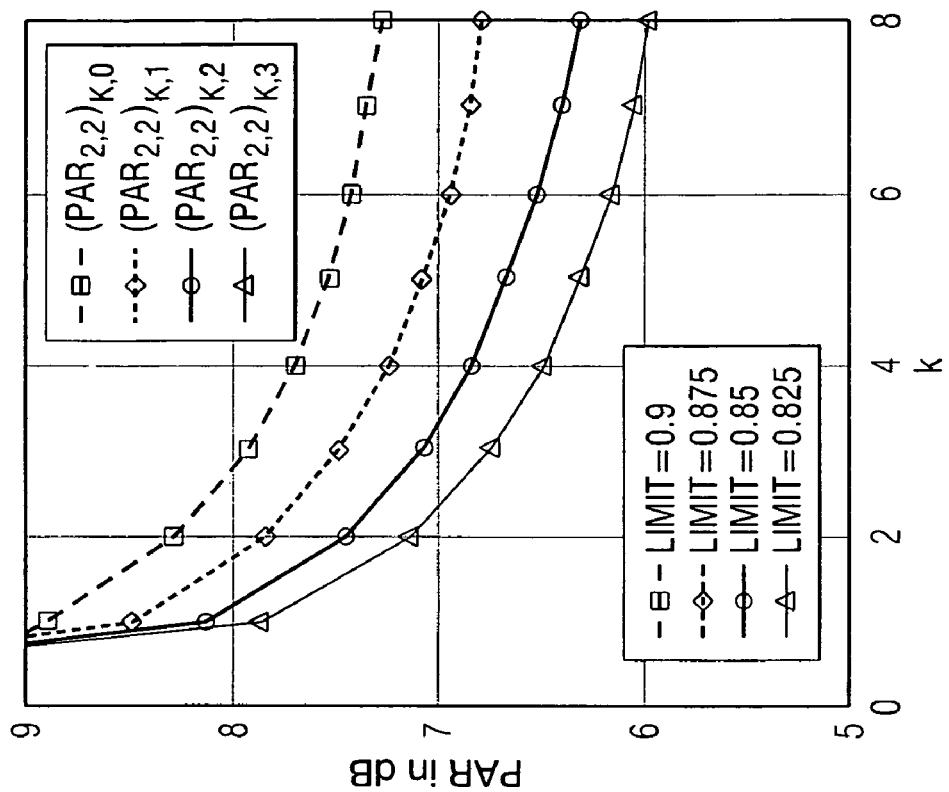
FIG. 17 is a graph showing simulated peak PAR results for the PAR reduction algorithm for HD Radio™ FM all-digital mode MP4 over a range of constraint values (limits between 0.825 and 0.9).
Figure 16:
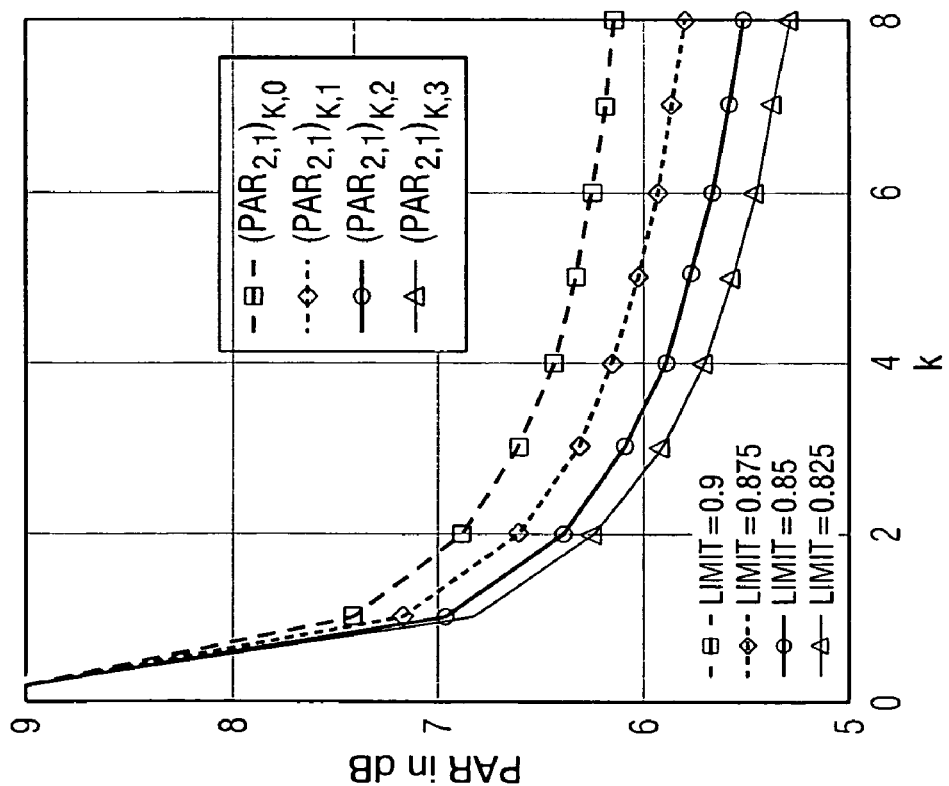
FIG. 16 is a graph showing simulated average PAR results for the PAR reduction algorithm for HD Radio™ FM all-digital mode MP4 over a range of constraint values (limits between 0.825 and 0.9).

Although it would be possible to prohibit any distortion in the secondary subcarriers by constraining them to the input OFDM symbol data vector, this is overly restrictive and would result in increased peak regrowth in the time domain signal. However the previously described constraint allows the distortion values to be relatively large even though the constraint for margin at the threshold value (e.g. 0.85) is imposed. This distortion results in significant increase in subcarrier power due to the distortion components greater than the nominal 1.0 values. A solution to this problem is to first constrain the constellation as previously described for the primary subcarriers. An additional constraint is imposed on the secondary subcarriers where the constrained new constellation value is an average of the newly constrained output and the input OFDM symbol data vector. This averaging reduces the large distortion values so that the resulting distortion is similar (proportional) to the primary subcarriers. A weighted average can further be used to adjust the degree of distortion reduction. Simulations have shown this to be effective. The results of the simulations are presented in FIGS. 15, 16 and 17. In FIG. 15, the digitally modulated signal is labeled 118, and the mask is labeled 120. An algorithm to constrain the QPSK constellation for the secondary subcarriers S is:

Constrain Qpsk Constellation For Secondary Subcarriers $(Re\{QPSK_n\} < \text{thres} \cdot Re\{d_n\})$ AND $(Re\{d_n\} > 0$, then let
$\quad x = \text{thres} \cdot Re\{d_n\}$ if $(Im\{QPSK_n\} > \text{thres} \cdot Im\{d_n\})$ AND $(Im\{d_n\} < 0$, then
$\quad$ let $x = \text{thres} \cdot Im\{d_n\}$ otherwise leave $QPSK_n$ unchanged.

$$QPSK_n = (1 - \text{weight}) \cdot QPSK_n + \text{weight} \cdot d_n;$$

additional constraint for secondary subcarriers where weight is typically 0.5 (0.45 stimulated).

The PAR reduction performance for the all-digital mode is less than for the hybrid modes due to the additional constraint on the secondary subcarriers. However the average PAR of less than 6 dB after four iterations is still an improvement of over 4 dB compared to the original signal.

Optional Equalization Compensation can be used for HPA output filtering. Linear distortion at the transmitter output can result from limited HPA bandwidth and additional filtering at the output network due to antenna combining or for the reduction of out-of-band emissions. A linear equalizer could be placed before the HPA to compensate for these effects. However, in a transmission system using the PAR reduction algorithm, this compensation would result in peak regrowth of the signal. This peak regrowth occurs because the phases and amplitudes of the signal have been slightly modified in the PAR algorithm to, in effect, cancel at the peaks. The equalization applied outside the PAR algorithm would change the phase and amplitude relationships where the peaks would not cancel in the same way. Placing this equalization prior to the previously-described PAR algorithm is also ineffective since the PAR algorithm will undo the equalization. However a modification to the PAR algorithm to include equalization can be effective.

The equalization compensation uses a vector (the same size as the OFDM symbol input vector) containing the reciprocal of the complex output gain (linear distortion) values for each subcarrier (active or inactive). Each of the elements of the input vector is multiplied by each of the corresponding elements of the equalization vector to yield an equalized input OFDM symbol data vector. The OFDM modulation and demodulation steps in the above algorithm remain unchanged, although the resulting OFDM symbol time domain samples are somewhat different due to the equalization. The equalization within the PAR reduction algorithm is either removed or restored at several steps in the algorithm such that the QPSK constraints imposed on the OFDM symbol vectors does not undo the equalization. Examples of the Equalization Compensation and removal algorithms are:

Equalization Compensation

OFDM_symbol_vector=input next OFDM symbol vector (e.g., 2048 complex elements)

$$EQ\_OFDM\_symbol\_vector = \begin{bmatrix} EQ_0 & & & & 0 \\ & EQ_1 & & & \\ & & \bullet & & \\ & & & \bullet & \\ 0 & & & & EQ_{2047} \end{bmatrix} \cdot OFDM\_symbol\_vector$$

Remove Equalization Compensation

EQ_OFDM_symbol_vector=input next OFDM symbol vector (e.g., 2048 complex elements)

$$OFDM\_symbol\_vector = \begin{bmatrix} 1/EQ_0 & & & & 0 \\ & 1/EQ_1 & & & \\ & & \bullet & & \\ & & & \bullet & \\ 0 & & & & 1/EQ_{2047} \end{bmatrix} \cdot EQ\_OFDM\_symbol\_vector$$

The effect is that the algorithm will continue to reduce the peaks with each iteration in the same manner as the PAR algorithm without equalization. However, the equalization is preserved through the PAR reduction process. Simulation results confirm that the PAR reduction performance with phase equalization is statistically identical to the performance without equalization. This is to be expected since distortions and peaks are iteratively corrected and converge in the same manner. However PAR reduction with severe amplitude equalization may be somewhat affected since this could change the effective power in the equalized output depending on the severity of subsequent filtering effects. For example, if a significant number of subcarriers are attenuated by 20 dB at the HPA output, the equalization would require proportionally more power to compensate for these subcarriers. The interaction of the intermodulation distortion over all the subcarriers of different equalized levels may have some effect on the potential PAR reduction. Furthermore, severe linear distortion can result in OFDM intercarrier interference as well as intersymbol interference which are not compensated in this algorithm. However, equalization for severely filtered HPA output signals should be used with caution.

In some applications the desired equalization may not be a predetermined fixed vector. Filtering and antenna/HPA output network impedance matching may change due to factors such as temperature, snow and aging. A feedback signal can be used to update the characteristics of the filtering which could adaptively update the equalization vector used in the PAR reduction algorithm. The feedback signal can be derived from a receiver (antenna) placed in a location near the exciter where it is unaffected by multipath distortion such that the receiver can measure the effects of filtering and linear distortion of the transmitted signal. This measured linear distortion can be converted into an equalization vector to be used in the PAR algorithm.

The AM/PM compensation function can be used to partially compensate for the AM/PM conversion introduced by the HPA. AM/PM is generally characterized by a slight delay in the time domain signal peaks as the signal in the HPA approaches saturation. By modeling this effect within the PAR reduction iterative process, the AM/PM degradation can be reduced. The AM/PM compensation is a bit more complex than the compensation (equalization) for linear distortion described previously. This is because the effects of AM/PM conversion are dependent on the instantaneous magnitudes of the OFDM symbol time domain samples. However the AM/PM can be introduced into the PAR reduction algorithm and be compensated in the iterative process of constraining the resulting constellations in the normal fashion. The AM/PM conversion is introduced immediately after the OFDM modulation steps in the algorithm. Unfortunately there are convergence issues to deal with in this case since the peaks are reduced in each iteration. Since the peaks are most affected by the AM/PM conversion, these effects will change with each iteration. There are two aspects of the algorithm to consider: first, the modeling of the AM/PM conversion as it affects the time domain samples; and second, a method for improving the convergence of the compensation with changing peaks for each iteration.

Figure 18:
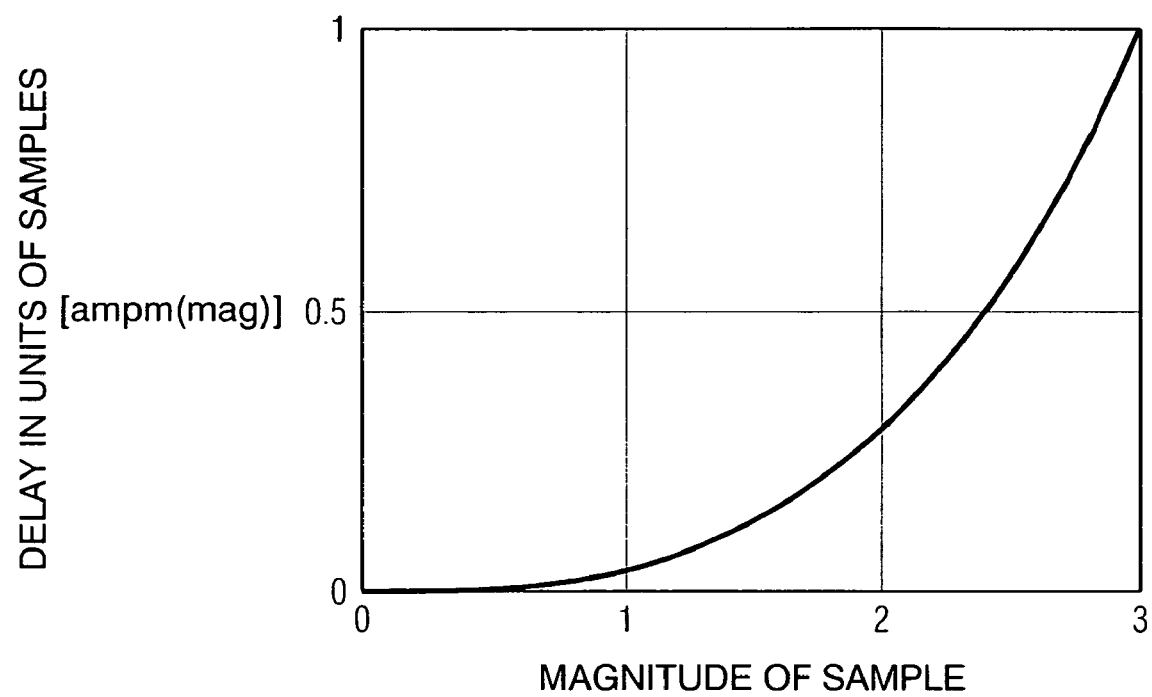
FIG. 18 is an example of an AM/PM conversion characteristic.

The AM/PM conversion for a particular HPA should be accurately characterized to achieve a benefit in compensation. This characterization should be converted in units of time delay as a function of instantaneous magnitude. An example of this characteristic is shown in FIG. 18. For convenience the AM/PM conversion time units can be characterized in terms of samples of delay as a function of magnitude, and the maximum delay to be compensated is limited to one signal sample (2160 samples/OFDM symbol for the HD Radio™ FM system). The effect of this AM/PM conversion is to "smear" each complex OFDM symbol time domain sample into the next sample; the smearing being a function of the sample magnitude. An example of the AM/PM conversion is shown in FIG. 18, and an example of an algorithm used to impose the AM/PM conversion onto the signal follows:

Am/Pm Conversion Algorithm Without Convergence Criteria
ampm$_n$=ampmconv(|s$_n$|); determine smearing value for this sample
s$_n$=(1−ampm$_n$)·s$_n$+ampm$_{n-1}$·s$_{n-1}$; smear samples as a function of ampm.

This algorithm acts as a nonlinear FIR filter whose coefficients are a dynamic function of the AM/PM conversion for each sample. However a more complex and accurate model can be generated if necessary to achieve the desired effect. The main issue with this simple algorithm is the changing peaks with each iteration of the algorithm, and its affect on convergence to an acceptable PAR reduction. To improve convergence, the algorithm is modified to gradually increase the effect of the AM/PM conversion with each iteration until the final iteration where the full effect is imposed. This can be achieved by multiplying the actual value of conversion by the present iteration number by the final iteration number. Simulation results reveal that this significantly improves convergence to achieve a lower PAR. An example of the modified AM/PM algorithm is shown next where an example AM/PM conversion proportional to the magnitude cubed of FIG. 18 is used.

Am/Pm Conversion Algorithm Without Convergence Criteria $$ampm_n = \frac{iteration}{final\_iter} \cdot |s_n|^3 \cdot 0.037;$$

determine smearing value for this sample
s$_n$=(1−ampm$_n$)·s$_n$+ampm$_{n-1}$·s$_{n-1}$; smear samples as a function of ampm.

In some applications the desired AM/PM conversion compensation may not be a predetermined fixed function. A feedback signal can be used to update the AM/PM function or a parameter in the function. Although simulation results showed reasonably good performance for this example, the actual characteristics may need further modification to yield good results with a particular HPA. It may be the case where the AM/PM conversion may not be sufficiently stable or accurately characterized to achieve good performance. Therefore, it should be tested for any particular HPA type.

This invention provides a method for reducing peak to average power ratio (PAR) in a radio frequency signal modulated with OFDM (Orthogonal Frequency Division Multiplexed) symbols. The method comprises an iterative process including the steps of modulating a set of subcarriers with a set of data symbol vectors (OFDM modulation) to produce a modulated signal; limiting the magnitude of the first modulated signal to produce a first limited modulated signal; demodulating the first limited modulated signal to recover the distorted input symbols (constellation points); constraining the new input data symbol vectors in such a manner as to minimize the negative effects of the limiting to produce constrained data symbol vectors, and suppressing out-of-band leakage; and remodulating the constrained OFDM symbol data vector. This process is performed by subsequent iterations of the above algorithm to further reduce the PAR ratio. Although various methods have been proposed, this method offers improved performance for reducing the PAR while controlling undesirable out-of-band emissions. It also includes equalization within the PAR reduction algorithm to compensate for the effects of linear filter-like distortion caused by the HPA output network, as well as partial compensation for nonlinear signal compression and AM/PM conversion below the peaks of the PAR-reduced signal.

This invention can be applied to reduce the PAR of electronic signals using OFDM, such as may be used in FM HD Radio™ systems. This invention also provides a means for equalizing the signal within the PAR reduction algorithm to compensate for linear distortion cause by the HPA output network (filter). Further compensation techniques for nonlinear distortions, such as AM/PM conversion, are also discussed. Optimization in PAR reduction performance for iBiquity Digital Corporation's HD Radio™ system is discussed as an example and application of the technique.

The algorithms were simulated and showed good performance. Improved features include provision for an out-of-band spectral mask, improved performance for secondary subcarriers in an all-digital system with different subcarrier levels, an option for equalization of the HPA output network, and AM/PM conversion compensation.

This invention controls out-of-band spectral emissions through use of a spectral mask. In one embodiment, improved algorithm parameters yield better performance. Reference subcarrier constellations can be restored with negligible peak regrowth. Equalization of linear distortion can be introduced by HPA output network. Convergence criteria can be used to reduce the distortion in lower-level secondary subcarriers. The effects of AM/PM distortion can be suppressed. All of these improvements can be performed within the PAR correction iterations instead of after the PAR algorithm, which would have resulted in peak regrowth.

While the present invention has been described in terms of several embodiments, it will be apparent to those skilled in the art that various changes can be made to the disclosed embodiments without departing from the scope of the invention, as set forth in the following claims.

What is claimed is:

1. A method of reducing peak-to-average power ratio in an OFDM signal, the method comprising the steps of:
    modulating a set of subcarriers with a set of data symbol vectors to produce a first modulated signal;
    limiting the magnitude of the first modulated signal to produce a first limited modulated signal;
    demodulating the first limited modulated signal to recover distorted input symbol vectors;
    constraining the distorted input symbol vectors to values greater than or equal to a minimum threshold value to produce constrained data symbol vectors;
    constraining out-of-band spectral components to lie within a predetermined mask;
    averaging the constrained data symbol vectors and the distorted input symbol vectors to produce averaged constrained data symbol vectors; and
    remodulating the averaged constrained data symbol vectors.

2. The method of claim 1, wherein all of the steps of claim 1 are repeated to further reduce peak-to-average power ratio of the OFDM signal.

3. The method of claim 1, wherein the step of constraining the distorted input symbol vectors comprises the step of:
    assigning the threshold value to bits of the distorted input vector having values less than the threshold value.

4. The method of claim 1, wherein the step of constraining the out-of-band spectral components further comprises the step of:
    applying the mask to nonactive subcarriers.

5. A method of reducing peak-to-average power ratio in an OFDM signal, the method comprising the steps of:
    modulating a set of subcarriers with a set of data symbol vectors to produce a first modulated signal;
    limiting the magnitude of the first modulated signal to produce a first limited modulated signal;
    demodulating the first limited modulated signal to recover distorted input symbol vectors;
    constraining the distorted input symbol vectors to values greater than or equal to a minimum threshold value to produce constrained data symbol vectors;
    constraining out-of-band spectral components to lie within a predetermined mask;
    remodulating the constrained data symbol vectors;
    equalizing the set of data symbol vectors prior to the modulating step;
    removing equalization of the set of data symbol vectors following the demodulating step; and
    restoring equalization of the set of data symbol vectors prior to the remodulating step.

6. The method of claim 5, wherein the equalizing step uses a vector containing the reciprocal of the complex output gain for each subcarrier.

7. The method of claim 6, further comprising the step of:
    adaptively updating the equalization vector.

8. The method of claim 1, further comprising the step of:
    compensating the first modulated signal for amplitude and phase modulation distortion.

9. The method of claim 1, wherein the step of modulating a set of subcarriers with a set of data symbol vectors, comprises the steps of:
    passing the data symbol vectors through an inverse fast Fourier transform; and
    applying a cyclic prefix, a guard band, and a raised root cosine window to the modulated signal.

10. The method of claim 9, wherein the demodulating step comprises the steps of:
    weighting and folding the cyclic prefix; and
    computing the fast Fourier transform of the data symbol vectors.

11. The method of claim 1, wherein the limiting step comprises soft clipping or compression modeling.

12. The method of claim 1, wherein the step of constraining the distorted input symbol vectors comprises the step of:
    placing a minimum value on real and imaginary components of the symbol vectors.

13. The method of claim 1, wherein the set of subcarriers include data subcarriers and reference subcarriers, and the step of constraining the distorted input symbol vectors comprises the steps of:
    placing a minimum value on real and imaginary components of the symbol vectors carried on the data subcarriers; and
    correcting real and imaginary components of the symbol vectors carried on the reference subcarriers.

14. The method of claim 1, wherein the step of constraining out-of-band spectral components to lie within a predetermined mask limits the magnitude of the out-of-band components to a non-zero magnitude.

15. The method of claim 1, wherein the average is a weighted average.

16. A method of reducing peak-to-average power ratio in an OFDM signal, the method comprising the steps of:
    modulating a set of subcarriers with a set of data symbol vectors to produce a first modulated signal;
    limiting the magnitude of the first modulated signal to produce a first limited modulated signal;
    demodulating the first limited modulated signal to recover distorted input symbol vectors;
    constraining the distorted input symbol vectors to values greater than or equal to a minimum threshold value to produce constrained data symbol vectors;
    constraining out-of-band spectral components to lie within a predetermined mask; and
    remodulating the constrained data symbol vectors;
    wherein the OFDM signal includes reference subcarriers and the method further comprises the step of:
    restoring reference signals on the reference subcarriers to original values of the reference signals.

17. A transmitter for reducing peak-to-average power ratio in an OFDM signal, the transmitter comprising:
    a modulator for modulating a set of subcarriers with a set of data symbol vectors to produce a first modulated signal;
    a limiter for limiting the magnitude of the first modulated signal to produce a first limited modulated signal;
    a demodulator for demodulating the first limited modulated signal to recover distorted input symbol vectors;

a processor for constraining the distorted input symbol vectors to values greater than or equal to a minimum threshold value to produce constrained data symbol vectors, for constraining out-of-band spectral components to lie within a predetermined mask, and for averaging the constrained data symbol vectors and the distorted input symbol vectors to produce averaged constrained data symbol vectors; and a remodulator for remodulating the averaged constrained data symbol vectors.

18. The transmitter of claim 17, further comprising:

an equalizer for equalizing the set of data symbol vectors prior to the modulating step.

19. The transmitter of claim 17, further comprising:

a compensator for compensating the first modulated signal for amplitude and phase modulation distortion.

20. A transmitter for reducing peak-to-average power ratio in an OFDM signal, the transmitter comprising:

means for modulating a set of subcarriers with a set of data symbol vectors to produce a first modulated signal;

means for limiting the magnitude of the first modulated signal to produce a first limited modulated signal;

means for demodulating the first limited modulated signal to recover distorted input symbol vectors;

means for constraining the distorted input symbol vectors to values greater than or equal to a minimum threshold value to produce constrained data symbol vectors, for constraining out-of-band spectral components by limiting the magnitude of the out-of-band components to a non-zero magnitude of a predetermined mask, and averaging the constrained data symbol vectors and the distorted input symbol vectors to produce averaged constrained data symbol vectors; and means for remodulating the averaged constrained data symbol vectors.

* * * * *

UNITED STATES PATENT AND TRADEMARK OFFICE
CERTIFICATE OF CORRECTION

PATENT NO. : 7,542,517 B2  Page 1 of 1
APPLICATION NO. : 10/770314
DATED : June 2, 2009
INVENTOR(S) : Brian William Kroeger It is certified that error appears in the above-identified patent and that said Letters Patent is hereby corrected as shown below:

Detailed Description of the Invention

Column 7, Line 15
"Ofdm" should read "OFDM"

Column 7, Line 34
"Ofdm" should read "OFDM"

Column 10, Line 9
"f" should read "if"

Column 10, Lines 21 and 22
"19" and "th" should not be separated

Column 11, Line 27
"Qpsk" should read "QPSK"

Column 13, Line 51
"Am/Pm" should read "AM/PM"

Column 14, Line 8
"Am/Pm" should read "AM/PM"

Signed and Sealed this

Twenty-fifth Day of May, 2010

David J. Kappos
*Director of the United States Patent and Trademark Office*